Nov. 15, 1966  J. CORRIGAN  3,285,710
APPARATUS FOR AUTOMATED RENDERING
Filed May 9, 1963  4 Sheets-Sheet 1

INVENTOR.
JOSEPH CORRIGAN
BY
Wilfred Baranick
ATTORNEYS

Nov. 15, 1966  J. CORRIGAN  3,285,710
APPARATUS FOR AUTOMATED RENDERING
Filed May 9, 1963  4 Sheets-Sheet 3
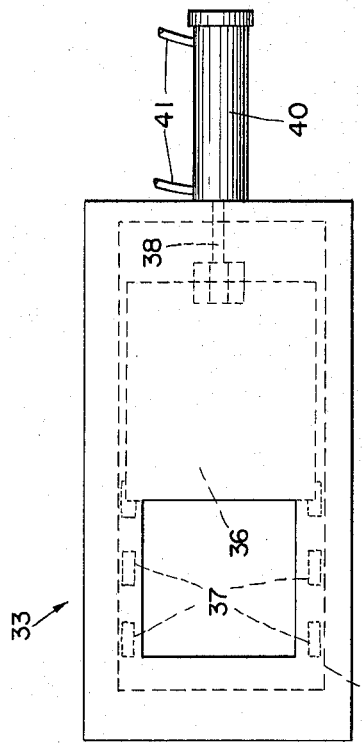
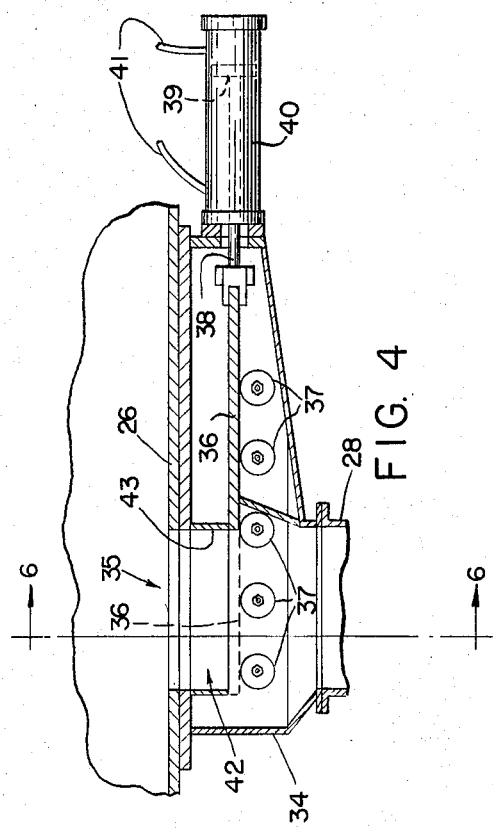
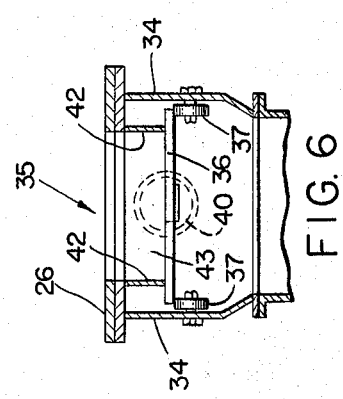
INVENTOR.
*Joseph Corrigan*
BY *Wilfred Baranick*
ATTORNEYS

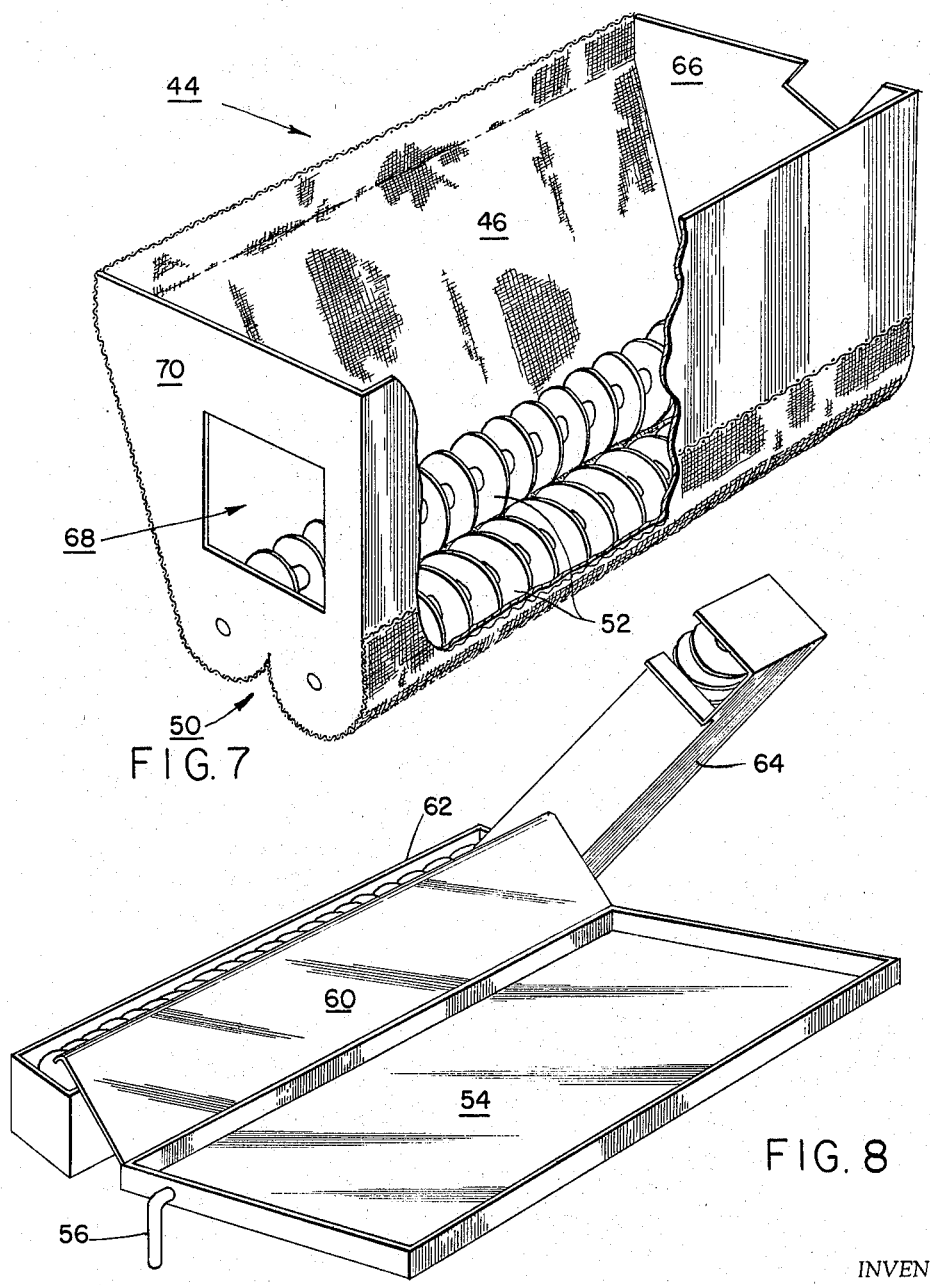

United States Patent Office 3,285,710
Patented Nov. 15, 1966

3,285,710
APPARATUS FOR AUTOMATED RENDERING
Joseph Corrigan, Newton Center, Mass., assignor to J. C. Corrigan Company, Inc., Boston, Mass., a corporation of Massachusetts
Filed May 9, 1963, Ser. No. 279,099
6 Claims. (Cl. 23—280)

The present invention relates to novel methods of and apparatus for operating a tallow rendering plant as associated with a meat packing operation or as a separate rendering plant wherein raw materials are received from sources outside the plant. More specifically, the invention is concerned with an automated system, comprising a unique combination of self-operating elements, which makes possible the processing of edible, as well as inedible, end products such as tallow and the like from raw materials.

Accordingly, it is a principal object of the present invention to provide methods and apparatus for processing raw materials to obtain an end product, such as tallow or the like, in an automated manner wherein the properties of the end product may be closely controlled while requiring a minimum of manpower.

A further object of the invention is to provide an automated system for the rendering of tallow or the like wherein the process may be closely controlled at all stages and which includes novel provisions for eliminating or minimizing the tendency of the materials being processed to clog, jam, etc., while passing automatically through the system.

Still another object is to provide apparatus which is capable of handling large volumes of material at all stages in processing thereof in the rendering of tallow and of storing the material at various stages, when required.

A still further object is the provision of apparatus comprising a novel combination of materials handling elements, such as conveyors and the like, and apparatus for performing various operations on the materials in the processing of tallow and the like, wherein the materials are transported at the proper time and in the proper quantity from one processing or storage means to the next in an automated manner.

Other objects of the invention will in part be obvious and will in part appear hereinafter.

The invention accordingly comprises the apparatus possessing the construction, combination of elements and arrangement of parts, and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a side elevation view, partly in section, of selected elements of the apparatus;

FIG. 5 is a top plan view of the elements shown in FIG. 4;

FIG. 6 is an end view in section on the line 6—6 of FIG. 4;

FIG. 7 is a top perspective view of still other portions of the apparatus shown diagrammatically in FIGURE 1; and FIG. 8 is a perspective view of still other elements of the apparatus.

Figure 1:
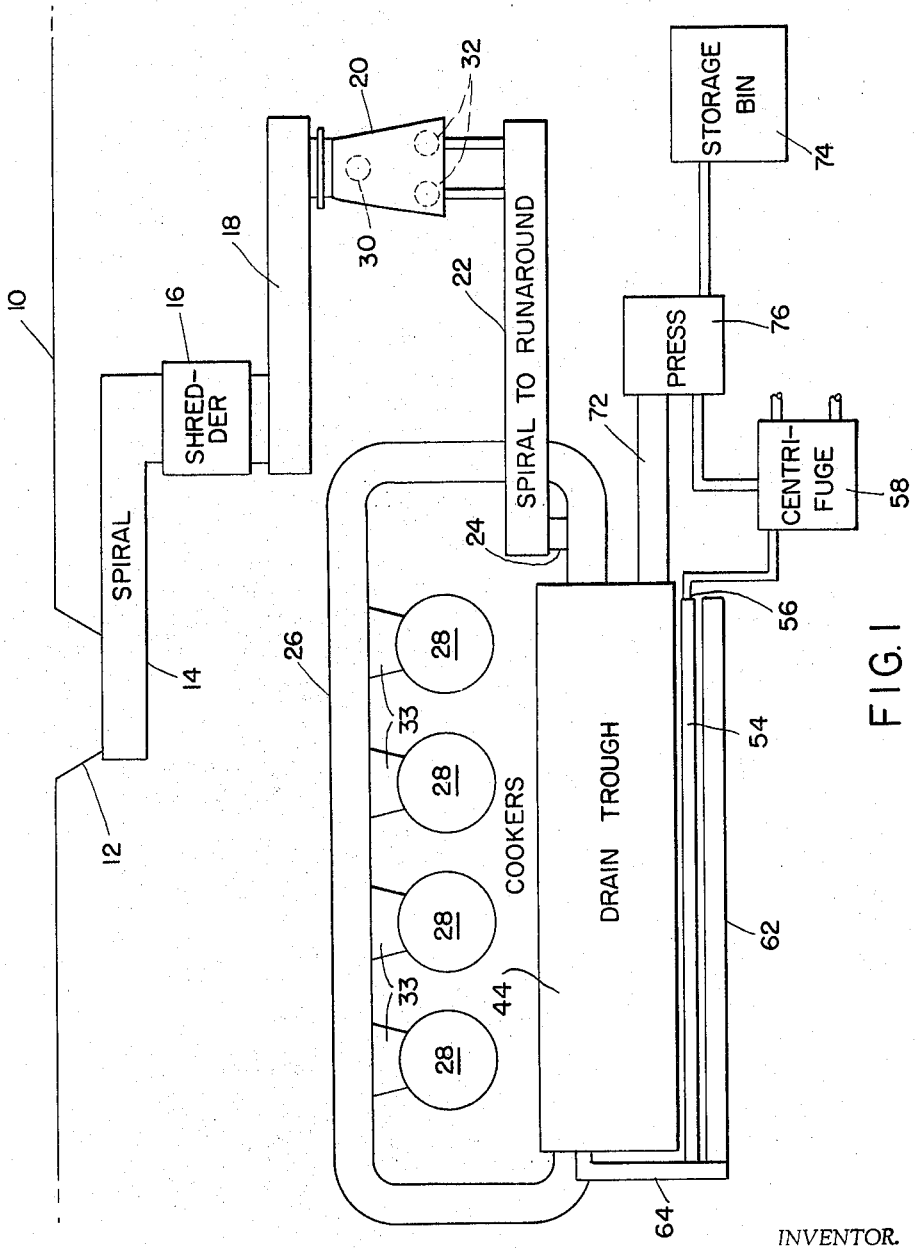
FIGURE 1 illustrates diagrammatically the various elements of apparatus and operations performed thereby from raw materials to end products.
Figure 2:
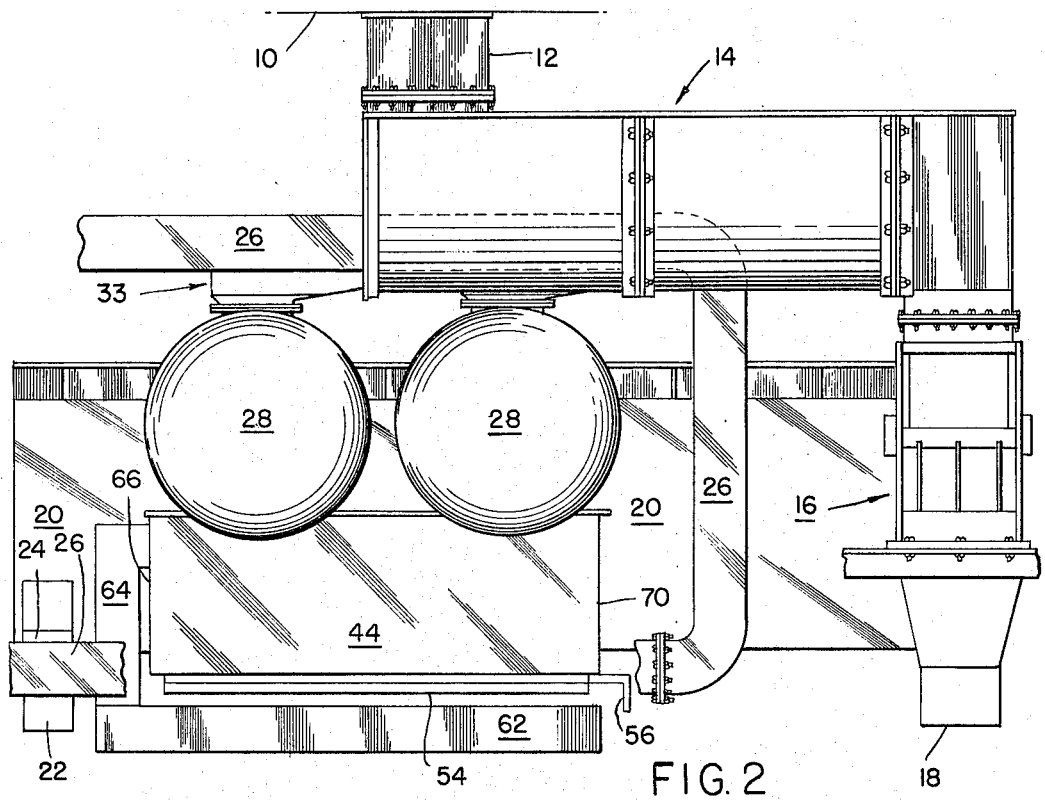
FIGS. 2 and 3 are front and side views, respectively, representing portions of the apparatus shown diagrammatically in FIGURE 1.

The above objects and advantages are realized in accordance with the present invention through the provision of means for automatically loading and unloading the various elements of apparatus which perform operations on or serve to store the materials and by providing novel design features of such apparatus which promotes the use of such automatic equipment. The rendering plant herein described may be operated in conjunction with and in close physical proximity to a slaughtering or meat packing operation, in which case the raw materials for the rendering operation may be transported directly from the point at which they are separated from the remaining materials which are to be otherwise processed or discarded. The plant is equally well adapted to be operated as a separate rendering plant which receives raw materials ready for processing from sources exterior to the plant. In either case the physical dimensions of the various elements which combine to form the plant may be easily adapted to permit accommodation within virtually any building suited for such purposes, as will be readily apparent to those skilled in the art.

It is the usual procedure in the rendering of tallow in both of the above-mentioned types of plants to crush, shred or pulverize the animal materials such as bones, hoofs, horns, etc., which are to be used and to heat this material to a temperature high enough to soften or liquefy the tallow, which is thereby separated and drained off from the remaining matter. The materials may be washed before shredding depending on the nature of the desired end products. The shredded materials are then heated in large cookers which discharge into some means for straining or otherwise separating the liquid tallow from the remaining "crackling." The tallow may be further purified by centrifuging or other means, and the crackling further dried, often by presses or expellers which force the moisture from the crackling.

According to the rendering process of the present invention the raw materials may be delivered to the shredder by a screw conveyor either directly from the trucks or other means in which it is received or in a totally enclosed chute directly below the kill floor. The material discharged by the shredder is transported by a second conveyor to one or more holding bins with live bottoms and top leveling screws. The bin (or bins) is of special design so that no hang-up or bridging can occur. A plurality of cookers may be supplied with material from the holding bin. Twin bottom screws discharge for a preset time or a preset volume, a quantity sufficient to fill each cooker. Automatic means are provided to control cooking time, assuring consistent and correct cooking. The free tallow and wet crackling are discharged from the cookers into a special, perforated drain trough, where the tallow is allowed to flow through the perforations into an inclined drain pan located below the trough. The small particles of solid material, or fines, which also pass through the perforations in the trough are retained, for the most part, in the drain pan as the tallow drains off. If desired, the tallow may be pumped to a surge and storage tank and then injected into a further separating device such as a centrifuge, filter press, settling tank, etc., which discharges the tallow, now of extreme clarity, from one end while discharging the remaining fines from the other end.

The tallow drain trough is fitted at the bottom with a pair of spirals which exert a pressing and agitating effect on the crackling while discharging it from the trough, thus resulting in improved drainage and dryer crackling. Means are also provided for reclaiming the fines which pass through the perforations in the trough. The majority of these fines remain in the drain pan when the tallow flows out. A horizontal and an inclined screw are provided to convey these fines, or any desired portion thereof, back into the trough to be mixed again with the crackling before being discharged to a press or expeller which forces out more tallow. When substantially all the tallow has been removed an end product of crackling which contains a predetermined proportion of reclaimed fines is left. This material, which is useful, for example, as a fertilizer and animal feeds, may then be packaged or stored in bulk tanks. Although in conventional processing the fines may again be mixed with the crackling at the press, an extra drainage is provided by the present invention with no material increase in handling or equipment since the fines would have to be delivered from the drain pan to the press in any event. Since the fines are returned to the drain trough, a substantial amount of the tallow which remains thereon after removal from the drain pan is allowed to drain off before the crackling and fines reach the press. This results in appreciably less pressing time and better operation of the press.

Referring now to the drawings, like reference numerals are used, so far as practicable, to denote in FIGURE 1 the diagrammatic counterparts of elements which are seen in more detail in the figures following. The diagrammatic showing of FIGURE 1 is intended only as an aid in following the flow of the materials through the various steps in the process and does not necessarily indicate the actual relative positions or configurations of the various elements of apparatus. The reference numeral 10 denotes figuratively the kill floor of a slaughter house or other source from which the raw materials, such as bones, hooves, horns and offal, are received. The materials pass through an opening into an enclosed chute 12 which communicates with spiral conveyor 14. A machine 16 for reducing the raw material to relatively small particles, as by crushing, shredding, pulverizing, or the like, receives the material from the discharge of conveyor 14 and shreds, crushes or pulverizes it into small pieces. For convenience, machine 16 will be considered a conventional shredder machine in the present application. As the material is shredded it is received from the discharge opening of shredder machine 16 by inclined conveyor 18, which is also preferably of the spiral type. The discharge of conveyor 18 empties the material into holding bin 20, the nature and function of which will be described later in more detail.

The discharge of holding bin 20 is received by conveyor 22 which communicates at 24 with enclosed run-around conveyor 26. Cookers, indicated collectively by reference numeral 28, are positioned in side-by-side relationship, and encircled by conveyor 26 which runs horizontally above and below the cookers, and vertically at each end of the cooker line. Cookers 28 are standard items of manufacture and normally include power-driven means for agitating the contents as they are heated. Run-around conveyor 26 is preferably a fully-enclosed, self-cleaning conveyor with L-shaped buckets which may be provided with an enameled finish to minimize or eliminate any tendency of the material to stick to the buckets. Although run-around conveyor 26 is suggested as a preferred means for loading cookers 28, it is to be noted that other automatic loading means such as power-driven spiral conveyors, may be provided for individually loading the cookers with material discharged by shredder machine 16.

Figure 3:
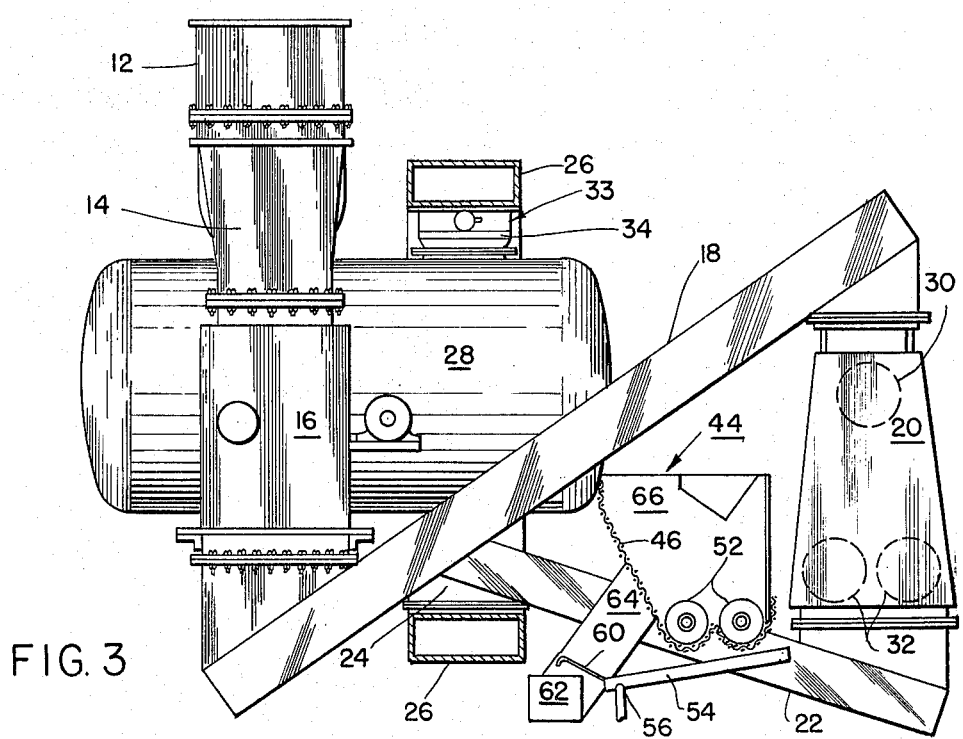

The arrangement and configuration of apparatus from the shredding of the raw material to the charging of the cookers provides a more versatile operation with apparatus which may be accommodated within virtually any suitable building. The size and number of cookers is, of course, a matter of choice depending on the desired capacity of the plant. It is also possible, and sometimes desirable, to provide more than one holding bin, as when large quantities of material are received at a faster rate than it can be heated and discharged by the cookers. Holding bin 20 is of special design with a live bottom. Material being discharged by shredder machine 16 may be received and stored by holding bin 20 whether any of cookers 28 are ready to be loaded or not. Delay in loading the cookers is therefore never encountered as long as incoming raw materials are received. A top screw 30 levels the material in the top of holding bin 20 to full capacity and a high level control (not shown) may be provided in a conventional manner to guard against overloading. Twin bottom screws 32 discharge, for a preset time, a quantity of material sufficient to fill each cooker. The holding bin is self-cleaning and no hang-up or bridging of material can occur as the bin is wider at the bottom than at the top. As best seen in FIG. 3, the sides slant outward from top screw 30 to twin bottom screws 32.

Run-around conveyor 26 is adapted to discharge into any or all of cookers 28. Hot water sprays may be located at various points inside the enclosure for the conveyor and may be turned on while the conveyor is running empty to clean the buckets. Drain openings may also be provided in the lower horizontal run of the enclosure to discharge the cleaning water. In general, rendering plants which are not located in the same building with a meat packing plant do not require a spray cleaning system for the run-around conveyor.

When conventional means are used to transport the material from the holding bin to the cookers it is necessary to open a gate or lid, which is normally hinged and opens upwardly from the top of the cooker. According to the present invention, gate units, indicated generally by the reference numeral 33, provide communication between run-around conveyor 26 and each of cookers 28. The details of one of gate units 33 are shown in FIGS. 4–6.

Each of gate units 33 includes casing 34 which provides an enclosed path between run-around conveyor 26 and each of cookers 28. Opening 35 in the bottom of the upper run of the enclosure for run-around conveyor 26 communicates with the interior of casing 34, and thereby with cooker 28, as best seen in FIG. 4. Cover plate 36 is reciprocally movable, as upon a plurality of rollers 37, for movement between covering and uncovering positions, shown respectively by dotted and solid lines in FIG. 4, with respect to opening 35. Shaft 38 is operatively connected to plate 36 at one end and extends through an end wall of casing 34 to be connected at the other end to piston 39. Cylinder 40, in which piston 39 is slidably arranged, is provided with inlet and outlet means 41 for a hydraulic or pneumatic operating fluid. Appropriate actuation will thus move piston 39 to cause movement of plate 36 between its covering and uncovering positions with respect to opening 35.

It will be noted that plate 36 is arranged somewhat below the plane of opening 35. When plate 35 is in the covering position the material carried by run-around conveyor 26 will be deposited on the top of plate 36 until it has reached the interior level of the bottom of the enclosure of the run-around. The additional material will then bypass gate unit 33. A box-like structure 42 extends downwardly from the top of casing 34 to approximate contact with plate 36. As plate 36 moves from the covering to the uncovering position (dotted to solid line position of FIG. 4) one wall 43 of box 42, which remains stationary as the plate moves, will serve to scrape off the material which has been deposited on the top of plate 36. This allows such material to drop into cooker 28 along with the other material which is transported by run-around conveyor 26 while plate 36 is in the uncovering position. As soon as the cooker has been loaded to the desired capacity plate 36 is again moved to the covering position by operation of the piston and cylinder arrangement. The material will again bypass that cooker and may be loaded into another by opening a different gate unit. The arrangement of plate 36 with respect to opening 35 and the provision of wall 43 allows easier movement of the plate and prevents binding from material becoming clogged between the plate and the upper wall of casing 34.

The various conveyors and screws may be driven in the conventional manner by electric motors, and electrical actuation may also be provided for the hydraulic or pneumatic operation of gate unit 33. For example, a limit switch (not shown) may be provided within casing 34 to be contacted by plate 36, or an element associated therewith, as the plate arrives at its respective terminal positions. Such a switch could control the opening and closing of valves which supply the operating fluid to the hydraulic or pneumatic system which moves the gate unit. An operator may therefore select a cooker to be loaded and push an actuating button to open the combination gate and lid associated therewith. Another control button turns on the driving power for discharge screws 32 of holding bin 20, conveyor 22, and run-around conveyor 26. As previously mentioned, the driving power to these conveyors may be preset so that material is discharged from holding bin 20 for a period of time sufficient to fill one cooker and the power then cut off automatically. The power to discharge screws 32 may be cut off first and conveyors 22 and 26 allowed to run for a sufficient period of time thereafter to empty themselves. Means may also be provided in such manner for automatically actuating gate unit 33 when the conveyors have emptied and the cooker is full. The other cookers may be loaded in the same manner and started by the operator on a desired cooking cycle.

It is to be noted that considerable space saving, as well as automatic operation, is provided by the use of run-around conveyor 26 and gate unit 33. When cookers are installed within an existing structure the head room above the cookers may be less than that required to open and close a conventional, hinged cooker lid. The recirpocally movable gate and lid in combination with the run-around conveyor allows operation within a minimum of vertical space. The vertical legs of the run-around conveyor at each end of the cooker line also require little space.

At the end of a preset cooking cycle, cookers 28 discharge the heated material, now separated into free tallow and wet crackling, into trough 44. Any water included with the materials delivered to cookers 28 is boiled off and ejected as steam to the atmosphere. Side wall 46 of trough 44, on the side which receives the discharge from cookers 28, is inclined inwardly toward the bottom. A plurality of perforations are provided in side wall 46 and bottom wall 50, as by forming these walls of a screen-like material. Within trough 44 and extending the length thereof near bottom wall 50 is provided a pair of spirals 52, comprising shafts carrying, respectively, right-hand and left-hand helixes. An appropriate drive system, preferably located outside and adjacent one end of trough 44, provides individual drives for spirals 52 for rotation in opposite directions. The crackling may be held for a time for stationary drainage of the tallow through the perforations. Spirals 52 are then set in motion, causing additional tallow to drain because of the squeezing action of the spirals on the crackling.

A certain amount of small, solid particles will, of course, also pass through the perforations with the tallow. Drain pan 54, located directly below trough 44, receives all the material passing through the perforations. Drain pan 54 is inclined slightly toward one corner which contains an opening 56. The liquid tallow flows across drain pan 54 and through opening 56 into a centrifuge, or other such separating means, indicated diagrammatically in FIGURE 1 by the reference numeral 58, wherein it is further purified. It is again noted that the tallow may first be pumped to a surge tank before entering centrifuge 58. The greater part of the fines which pass through the perforations settle out of the tallow in drain pan 54. When a sufficient amount of fines has accumulated in drain pan 54 they may be raked over inclined side wall 60 thereof into horizontal conveyor 62 which extends the length of drain pan 54 parallel to the longitudinal axis of trough 44. At the discharge end of conveyor 62 the fines are received by inclined conveyor 64 which deposits them back into trough 44 by discharging through end wall 66 thereof. The fines are again mixed with the crackling in trough 44 through the action of spirals 52. All of the fines which pass through the perforations and settle in drain pan 54, or any desired portion thereof, may thus be reclaimed and mixed with the crackling before it is discharged from trough 44 for final processing. After the free tallow has been drained out the crackling and fines are discharged from trough through an opening 68 in end wall 70. As seen diagrammatically in FIGURE 1, conveyor 72 may transport the material to a surge bin or directly to screw press 76. The screw press, which may be equipped with a magnetic separator, removes any remaining moisture from the material and the dry end product may then be transported to storage means such as bin 74.

Electrical controls may conveniently be provided for the various items of equipment so that the entire rendering operation may be controlled from one central panel. With the automated system of the present invention all raw materials from the day's kill is completely processed as soon as it is provided. Such fast processing also results in higher grade tallow and dry crackling.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. Apparatus for rendering tallow and the like comprising, in combination:
   (a) at least one cooker having an opening at the top and adapted to heat the tallow-containing raw material to a temperature sufficient to liquefy the tallow therein;
   (b) a continuous, enclosed, power-driven conveyor which passes over, under and around said cooker;
   (c) means for introducing said raw material into said conveyor;
   (d) gate means selectively operable to provide communication between said conveyor and said opening whereby the material carried by said conveyor may be dropped through said opening into said cooker;
   (e) a container having a plurality of perforations therein;
   (f) means for discharging the contents of said cooker into said container;
   (g) means for receiving the tallow which passes through said perforations; and
   (h) power-driven means adapted to discharge from said container the material remaining therein.

2. Apparatus for rendering tallow and the like comprising, in combination:
   (a) a holding bin for the tallow-containing raw material which is larger in horizontal cross section at the bottom than at the top;
   (b) means for discharging said material from said bin at the bottom thereof;
   (c) at least one cooker having an opening at the top and adapted to heat the tallow-containing raw material to a temperature sufficient to liquefy the tallow therein;
   (d) continuous, enclosed, power-driven conveyor means at least a portion of which passes above said opening;
   (e) means for introducing said raw material into said conveyor means;
   (f) gate means selectively operable to provide communication between said conveyor and said opening whereby the material carried by said conveyor may be dropped through said opening into said cooker;
   (g) a container having a plurality of perforations therein;

(h) means for discharging the contents of said cooker into said container;
(i) means for receiving the tallow which passes through said perforations; and
(j) power-driven means adapted to discharge from said container the material remaining therein.

3. Apparatus for rendering tallow and the like comprising, in combination:
(a) a holding bin for the tallow-containing raw material which is larger in horizontal cross section at the bottom than at the top;
(b) means for discharging said material from said bin at the bottom thereof;
(c) a plurality of cookers each having an opening at the top and adapted to heat said material to a temperature sufficient to liquefy the tallow therein;
(d) continuous, enclosed, power-driven conveyor means encircling said plurality of cookers and having portions passing above each of said openings;
(e) means for introducing said material into said conveyor means;
(f) a plurality of gate means each of which is selectively operable to provide communication between said conveyor means and one of said openings, whereby upon operation of one of said gate means the material carried by said conveyor means drops through the opening associated with said one of said gate means and into the associated cooker;
(g) a container having a plurality of perforations therein;
(h) means for discharging the contents of said cooker into said container;
(i) means for receiving the tallow which passes through said perforations; and
(j) power-driven means adapted to discharge from said container the material remaining therein.

4. Apparatus for rendering tallow and the like comprising, in combination:
(a) a holding bin for the tallow-containing raw material which is larger in horizontal cross section at the bottom than at the top;
(b) means for discharging said material from said bin at the bottom thereof;
(c) at least one cooker having an opening at the top and adapted to heat the tallow-containing raw material to a temperature sufficient to liquefy the tallow therein;
(d) continuous, enclosed, power-driven conveyor means at least a portion of which passes above said opening;
(e) means for introducing said raw material into said conveyor means;
(f) gate means selectively operable to provide communication between said conveyor and said opening whereby the material carried by said conveyor may be dropped through said opening into said cooker;
(g) a first container for receiving the discharge of said cooker and including at least one wall having a plurality of perforations therein;
(h) a second container located below said first container to receive the tallow and solid particles which pass through said perforations;
(i) means for removing said tallow from said second container while allowing at least a portion of said solid particles to remain therein;
(j) power-driven transporting means for returning a desired portion of said solid particles to said first container and depositing it therein; and
(k) power-driven means selectively operable to discharge from said first container the material remaining therein.

5. Apparatus for rendering tallow and the like comprising, in combination:
(a) a holding bin for the tallow-containing raw material which is larger in horizontal cross section at the bottom than at the top;
(b) means for discharging said material from said bin at the bottom thereof;
(c) a plurality of cookers each having an opening at the top and adapted to heat said material to a temperature sufficient to liquefy the tallow therein;
(d) continuous, enclosed, power-driven conveyor means encircling said plurality of cookers and having portions passing above each of said openings;
(e) means for introducing said material into said conveyor means;
(f) a plurality of gate means each of which is selectively operable to provide communication between said conveyor means and one of said openings, whereby upon operation of one of said gate means the material carried by said conveyor means drops through the opening associated with said one of said gate means and into the associated cooker;
(g) a first container for receiving the discharge of said cooker and including at least one wall having a plurality of perforations therein;
(h) a second container located below said first container to receive the tallow and solid particles which pass through said perforations;
(i) means for removing said tallow from said second container while allowing at least a portion of said solid particles to remain therein;
(j) power-driven transporting means for returning a desired portion of said solid particles to said first container and depositing it therein; and
(k) power-driven means selectively operable to discharge from said first container the material remaining therein.

6. Apparatus for rendering tallow and the like comprising, in combination:
(a) a holding bin for the tallow-containing raw material which is larger in horizontal cross section at the bottom than at the top;
(b) means for discharging said material from said bin at the bottom thereof;
(c) a plurality of cookers each having an opening at the top and adapted to heat said material to a temperature sufficient to liquefy the tallow therein;
(d) continuous, enclosed, power-driven conveyor means encircling said plurality of cookers and having portions passing above each of said openings;
(e) means for introducing said material into said conveyor means;
(f) a plurality of gate means each of which is selectively operable to provide communication between said conveyor means and one of said openings, whereby upon operation of one of said gate means the material carried by said conveyor means drops through the opening associated with said one of said gate means and into the associated cooker;
(g) a first container for receiving the discharge of said cooker and including at least one wall having a plurality of perforations therein;
(h) a second container located below said first container to receive the tallow and solid particles which pass through said perforations;
(i) means for removing said tallow from said second container while allowing at least a portion of said solid particles to remain therein;
(j) power-driven transporting means for returning a desired portion of said solid particles to said first container and depositing it therein;
(k) an expeller adapted to receive the material from said first container from which the tallow has drained and press additional tallow therefrom;
(l) power-driven means selectively operable to discharge from said first container the material remaining therein; and
(m) an additional power-driven conveyor adapted to receive the material discharged from said first container, transport said material to said expeller and deposit it therein.

References Cited by the Examiner

UNITED STATES PATENTS

| | | | |
|---|---|---|---|
| 1,578,245 | 3/1926 | Laabs | 260—412.6 |
| 1,766,033 | 6/1930 | Mealsin | 23—280 |
| 1,791,439 | 2/1931 | Allbright | 260—412.6 |
| 2,035,090 | 3/1936 | Molin | 23—280 |
| 3,046,286 | 7/1962 | Speer et al. | 260—412.6 |
| 3,158,634 | 11/1964 | Marsh | 260—412.6 |
| 3,180,880 | 4/1965 | Harrison et al. | 260—412.6 |

FOREIGN PATENTS 602,464  7/1960  Canada.

MORRIS O. WOLK, *Primary Examiner.*

IRVING MARCUS, CHARLES B. PARKER, JAMES H. TAYMAN, JR., A. H. SUTTO, *Assistant Examiners.*